(12) United States Patent
Keller et al.

(10) Patent No.: US 9,276,305 B2
(45) Date of Patent: Mar. 1, 2016

(54) METHOD AND APPARATUS FOR PROVIDING A MULTIFUNCTION SENSOR USING MESH NANOTUBE MATERIAL

(71) Applicant: U.S. Army Research Laboratory ATTN: RDRL-LOC-I, Adelphi, MD (US)

(72) Inventors: Steven D. Keller, Bethesda, MD (US); Amir I. Zaghloul, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 472 days.

(21) Appl. No.: 13/686,944

(22) Filed: Nov. 28, 2012

(65) Prior Publication Data

US 2013/0293429 A1    Nov. 7, 2013

Related U.S. Application Data

(60) Provisional application No. 61/641,468, filed on May 2, 2012.

(51) Int. Cl.

| H01P 11/00 | (2006.01) |
|---|---|
| H01Q 21/26 | (2006.01) |
| H01Q 1/00 | (2006.01) |
| H01Q 1/27 | (2006.01) |
| H01Q 9/04 | (2006.01) |
| B82Y 15/00 | (2011.01) |

(52) U.S. Cl.
CPC .............. *H01Q 1/00* (2013.01); *H01Q 1/273* (2013.01); *H01Q 9/0407* (2013.01); *B82Y 15/00* (2013.01); *Y10T 29/49016* (2015.01)

(58) Field of Classification Search
CPC ....... H01Q 1/00; H01Q 9/0407; H01Q 1/273; Y10T 29/49016
See application file for complete search history.

(56) References Cited

U.S. PATENT DOCUMENTS

| 5,176,951 | A   * | 1/1993  | Rudo ............................ 442/220 |
|---|---|---|---|
| 2004/0095256 | A1 * | 5/2004  | Mohamadi ............... 340/870.18 |
| 2007/0054577 | A1 * | 3/2007  | Avloni ......................... 442/110 |
| 2008/0143230 | A1 * | 6/2008  | Rueger ........................ 313/238 |
| 2010/0097273 | A1 * | 4/2010  | Biris et al. ................ 343/700 R |
| 2011/0290104 | A1 * | 12/2011 | Warren ........................ 89/36.02 |
| 2014/0178726 | A1 * | 6/2014  | Kwon et al. .................... 429/94 |

* cited by examiner

*Primary Examiner* — Trinh Dinh
(74) *Attorney, Agent, or Firm* — Alan I. Kalb

(57) ABSTRACT

A method and apparatus for providing multiple functions using nanotube threads comprising: a first nanotube thread and a second nanotube thread, the first nanotube thread and the second nanotube thread arranged to form a mesh, wherein the first nanotube thread further comprises a measurable invariant property and the second nanotube thread comprises a measurable variant property.

4 Claims, 11 Drawing Sheets

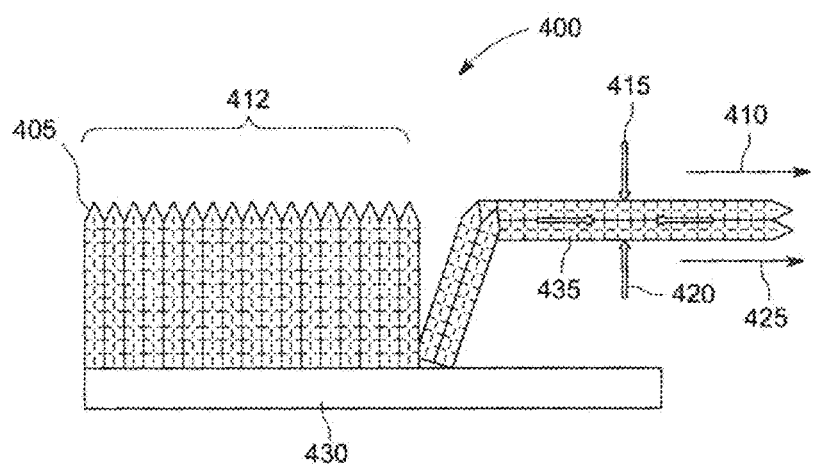
FIG. 4
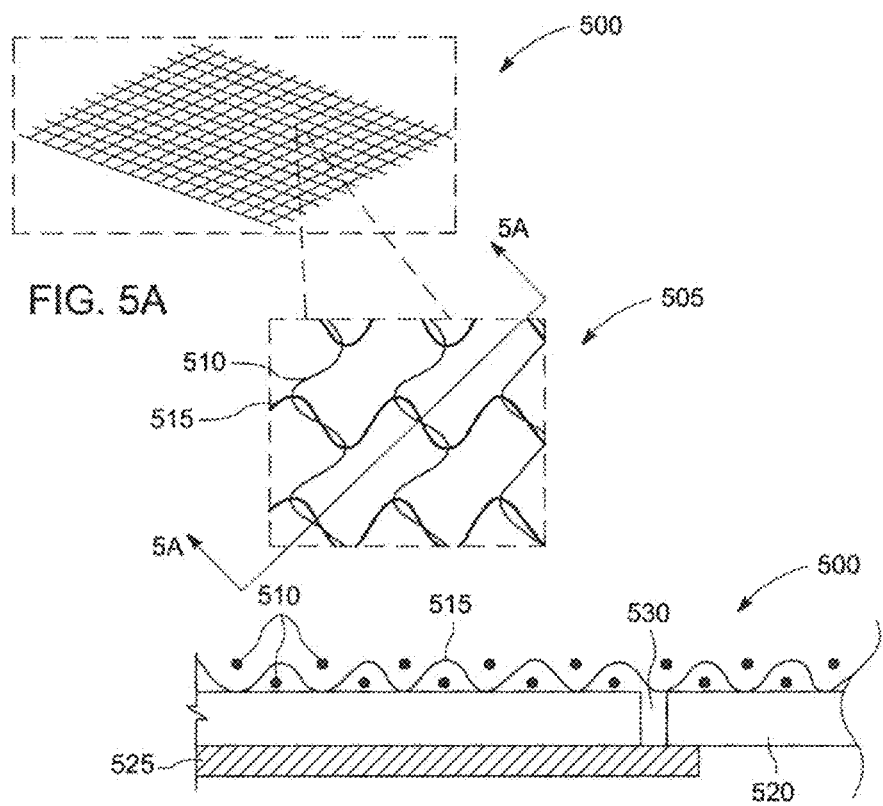
FIG. 5A
FIG. 5B

METHOD AND APPARATUS FOR PROVIDING A MULTIFUNCTION SENSOR USING MESH NANOTUBE MATERIAL

CROSS REFERENCE TO RELATED APPLICATIONS

This application claims benefit of U.S. provisional patent application Ser. No. 61/641,468, filed May 2, 2012 which is herein incorporated by reference.

GOVERNMENT INTEREST

The invention described herein may be manufactured, used and licensed by or for the U.S. Government.

FIELD OF INVENTION

Embodiments of the present disclosure generally relate to wireless signal communications and, more specifically, to a method and apparatus for providing a multifunctional meshed nanotube sensor.

BACKGROUND OF THE INVENTION

The capability to provide multiple functions for a single device provides convenient savings in physical space and costs. One traditionally single-tasked device is an antenna. Antennas used in the communication of electromagnetic signals have been developed with a concern for size reduction while providing high fidelity information during transmission and/or reception. Patch antennas have been a preferred choice of radio frequency (RF) front end design for their reliability and low profile topology. Such a profile makes them ideal for wireless systems where physical space on a wireless device is limited. Patch antennas are also lightweight and enable mounting onto various surfaces that are not suitable for dipole, wire loop, or multi-element antennas. The patch antenna has proven to be quite effective for a variety of applications, including terrestrial and satellite communications systems and various electromagnetic scanning arrays due to its low-profile, planar structure, reasonable bandwidth, and excellent gain.

Antenna material composition is crucial in ensuring the efficient and accurate transmission and/or reception of wireless signals. The conductivity of these materials plays a critical role in not contributing to attenuation or distortion of signals already degraded by environmental factors experienced during propagation. Traditional patch antennas are constructed from conductive metals such as copper.

FIG. 1 is a schematic illustration of a traditional microstrip patch antenna. FIG. 1 depicts a patch antenna 100 mounted on a substrate 115. An electromagnetic wave is transmitted and/or received according to a radiating edge or slots (shown as 125, 130) of the patch antenna 100 given its length 105 and width 110. Radiating slots 125 and 130 produce a broadside radiation pattern 145. When the substrate thickness 140 is small, radiation is approximated by horizontal magnetic currents circulating the perimeter of the patch antenna 100 over a ground plane 135. Communication of signals received or to be transmitted by the patch antenna 100 is achieved using an impedance matched microstrip feed line 120.

Military personnel and first responders carry various equipment to communicate with others and provide environmental information about their surroundings. For example, personnel may carry a wireless communications device as well as an environmental condition detector (e.g. temperature, pressure, gas, and the like). Carrying numerous devices decreases mobility, agility, and effectiveness of the user.

Thus, there is a need in the art for a method and apparatus that can provide a multifunction sensor (e.g. both wireless communication as well as gas detection) in a compact lightweight form factor.

SUMMARY

Embodiments of the present method and apparatus generally relate to a multifunction meshed patch sensor capable of simultaneous wireless communication and gas detection/sensing. The patch sensor comprising a first nanotube thread and a second nanotube thread, the first nanotube thread and the second nanotube thread alternately crossing each other substantially orthogonally to define a mesh element, wherein the first nanotube thread further comprises a measurable invariant property and the second nanotube thread comprises a measurable variant property.

BRIEF DESCRIPTION OF THE DRAWINGS

So that the manner in which the above recited features of the present disclosure car be understood in detail, a more particular description of the embodiment, briefly summarized above, may be had by reference to embodiments, some of which are illustrated in the appended drawings. It is to be noted, however, that the appended drawings illustrate only typical embodiments in this disclosure and are therefore not to be considered limiting of its scope, for the disclosure may admit to other equally effective embodiments.

FIG. 4 illustrates the formation of nanotube thread used in an exemplary embodiment of the present invention.

FIGS. 5A and 5B illustrate an exemplary mesh construction used in an embodiment of the present invention.

DETAILED DESCRIPTION

An embodiment of the present invention provides a multifunction sensor (e.g. an antenna and gas detector) integrated into a single device. In one embodiment, mesh construction of interwoven semiconductive and conductive nanotube threads capable of transceiving signals as well as changing properties when exposed to particular gases.

Figure 1:
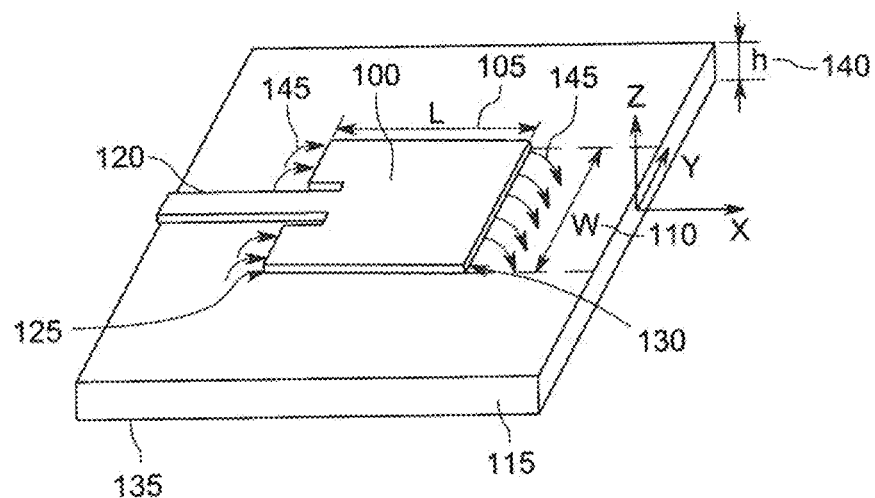
FIG. 1 is a schematic illustration of a traditional microstrip patch antenna.
Figure 2:
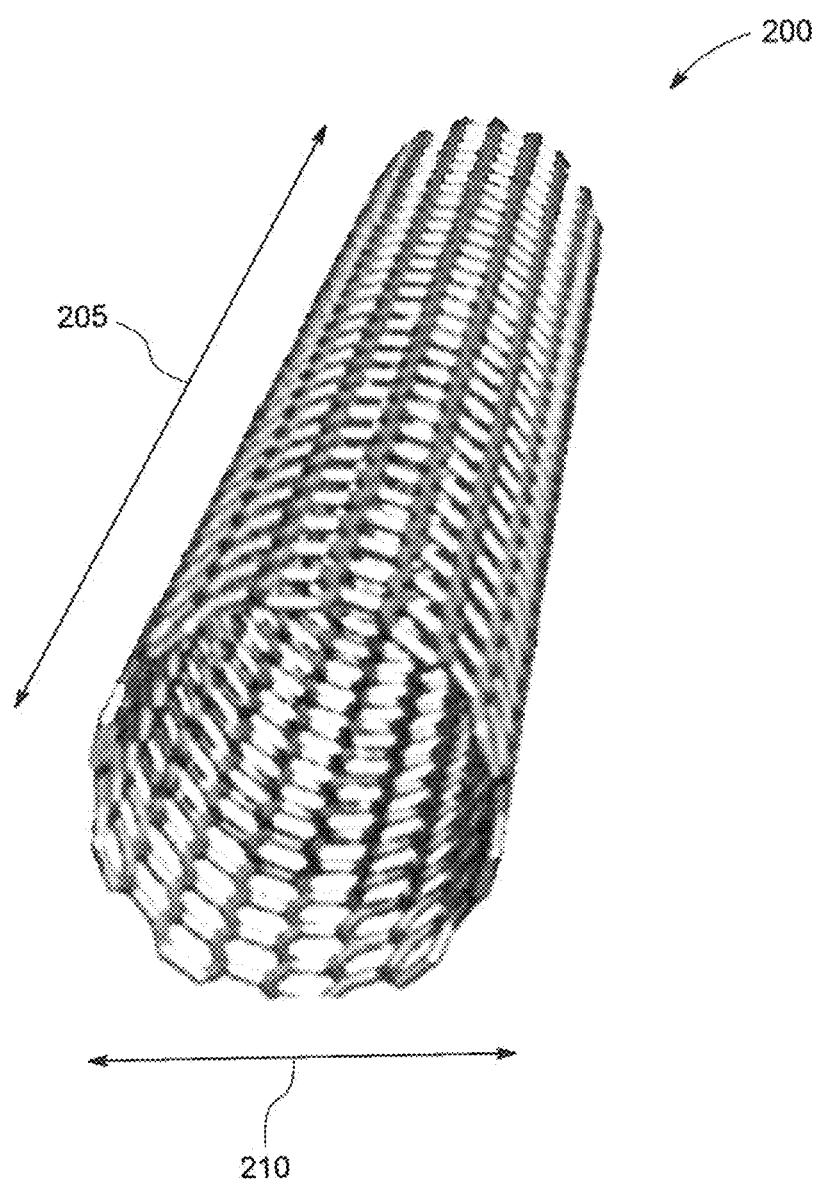
FIG. 2 is a perspective view of a first type of nanotube material used in an embodiment of the present invention.

FIG. 2 is a perspective view of a first type of nanotube material used in an embodiment of the present invention. Carbon nanotube (CNTs) structures to be used in embodiments of the invention are allotropes of carbon with a cylindrical nanostructure and may be single walled nanotubes (SWNTs) or multiwall nanotubes (MWNTs). Both SWNTs and MWNTs may be applied in embodiments of the invention. FIG. 2 depicts a perspective view of SWNT comprised of a single monatomic layer of carbon rolled up into a hollow cylindrical tube 200. The particular length (arrow 205) of the tube 200 can vary in size but is typically very small, for example, 0.2-5 μm. The tube 200 may have a width (arrow 210) of approximately 1-2 nm. One of the more recently researched properties of MWNTs is their wave absorption characteristics, specifically microwave absorption, which indicate that they are a viable material in the formation of antennas.

Figure 3:
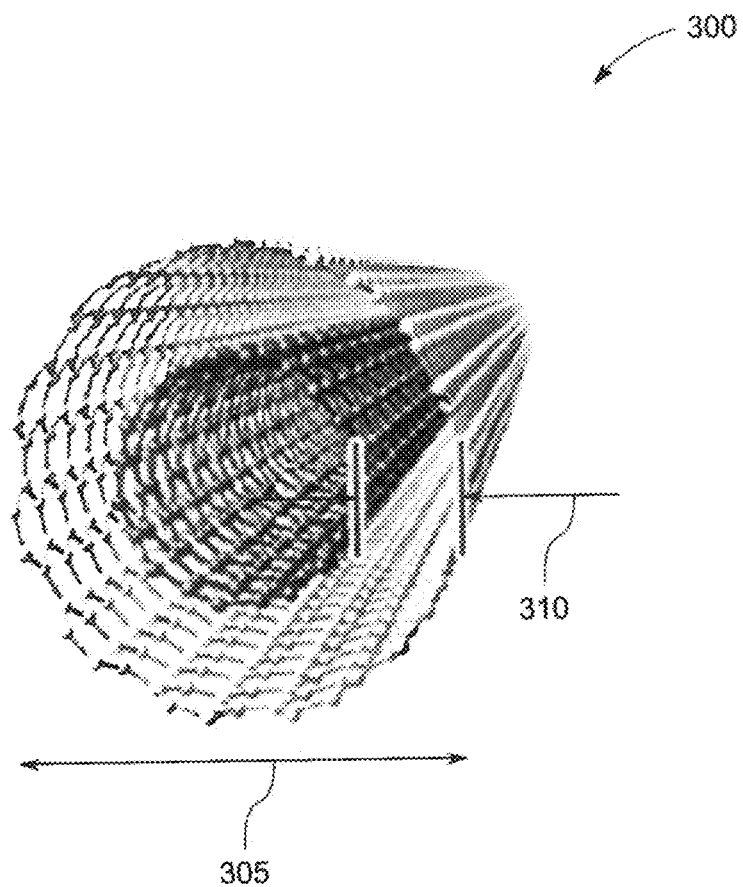
FIG. 3 is a perspective view of a second type of nanotube material used in an embodiment of the present invention.

FIG. 3 is a perspective view of a second type of nanotube material used in an embodiment of the present invention. The nanotube material may be MWNT, which may consist of two or more concentric cylinders of monatomic carbon layers. As an example, two layers are separated by a small gap 310 and can be as small as 0.36 nm with a combined width 305 of about 2-25 nm. The absorption characteristics may be altered by how certain metals fill, surround, or layer with respect to MWNT 300. The filling of MWNT with certain metals, such as iron for example, changes complex permeability ($\mu_r$) and complex permitivity ($\in_r$) of the material. In antenna applications, altering permeability and permittivity in a controlled manner can result in improvements in maximum absorption and bandwidth.

FIG. 4 illustrates the formation of nanotube thread used in an exemplary embodiment of the present invention. Nanotubes may be formed into CNT threads 435 through a pulling technique 400. The method begins with individual CNT 405 in a CNT forest 412 that is grown on a substrate 430. Individual is nanotubes 405 naturally align themselves into intertwined "bundles" 435 held together by Van Der Waals forces (415 and 420), and more specifically, pi-stacking. The technique 400 forms the carbon nanotube thread by a pulling force (shown as 410 and 425) which may be supplied by a collection spool (not shown) or other pulling device. The composition of the thread 435 may include SWNT, MWNT, or a combination thereof. The interwoven CNT thread 435 can be used to construct a mesh structure with the beneficial physical properties of CNTs, including light weight and high tensile strength.

FIGS. 5A and 5B illustrate an exemplary mesh construction used in an embodiment of the present invention. FIG. 5A depicts one embodiment that includes the interwoven CNT threads 505 in a CNT meshed patch 500. The manipulation of threads provides physical flexibility to the patch 500 as well as allows for ease of integration with other materials such as textile threads. In one embodiment, threads are spaced about λ/67 apart to visually be close to typical textile thread space, however alternative spaces may be realized. Additionally, other weaving patterns or shapes may be realized besides those shown in FIG. 5. A knitting machine could be used to create plaited fabrics. Layers of the weaving is limited only to the application of the mesh patch and substrate materials.

FIG. 5A also depicts a basket weave 505 wherein threads 510 alternate above and below threads 515. The respective threads are interwoven such that alternating columns of one type of thread line 510 sits atop a row of another type of thread line 515 and vice versa. A basket weave 505 construction is disclosed but it will be appreciated by one skilled in the art that alternative patterns may also be realized. FIG. 5B depicts a cross-sectional view of the embodiment in which the basket weave 500 threads are formed as a patch 500 over a substrate 520. This embodiment uses an aperture 530 to expose and couple the patch to a microstrip feedline 530. The feedline 530 ultimately communicates signals to and from the patch 500 for operation with accompanying electronics, as detailed below.

Figure 6:
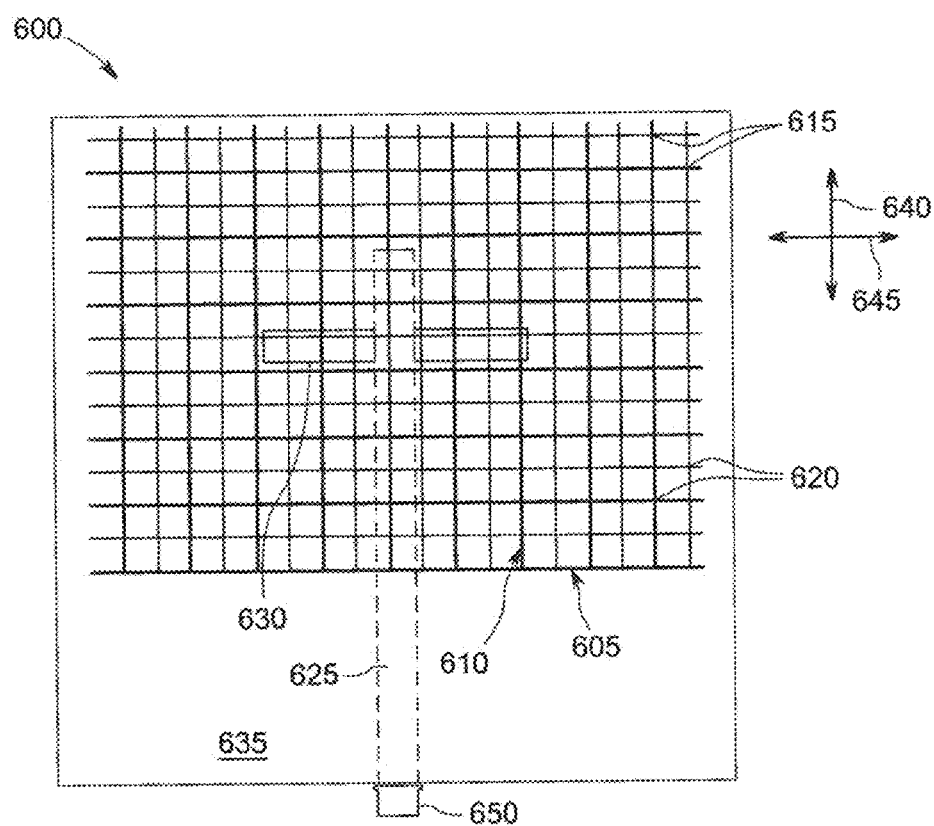
FIG. 6 is an illustration showing of the meshed patch configuration in accordance with an embodiment of the present invention.

FIG. 6 is an illustration showing of the meshed patch configuration in accordance with an embodiment of the present invention. FIG. 6 depicts a top plan view (i.e. a two dimensional view represented by arrows 640 and 645) of the specific weaving pattern for a mesh patch 600 on an exemplary substrate 635. It will be appreciated that the respective threads of one type are interwoven with a second type in the meshed patch 600. As a specific example, conductive MWNTs thread lines 605 run in first line axis 645 and semiconducting thread lines 610 comprised of nanotubes with significant added defects run in a second thread line axis 640. The semiconducting thread lines 610 substantially orthogonal to the first thread line axis 645. Threads depicted as an intersection 615 are formed in a basket weave pattern, as described above. Although the axes of specific materials may be switched in other embodiments. FIG. 6 also depicts an embodiment wherein threads of the same type 620 are electrically connected when they cross above and/or below each other at their intersections 620 across at least two layers of the meshed patch 600.

One exemplary embodiment design consists of a 2.65× 3.68 nm patch constructed from 50 μm diameter meshed CNT threads 605, 610 residing on a ground plane (not shown) separated by a dielectric substrate 635. An exemplary construction of the substrate may include an RT/Duriod 6010 ($\in_r$=10.2) feedline layer, RT/Durioud 5870 ($\in_r$=2.33) for a patch layer. The mesh patch 600 of FIG. 6 connects to a microstrip feedline 625 through an aperture 630, as further illustrated in FIG. 7. The microstrip feedline 625 connects through a connector 650 to additional electronics for processing as will be discussed further below. Positioning of the aperture 630 is dependent on the size of the meshed patch 600 and the operating frequency and length of the feedline 625.

Figure 7:
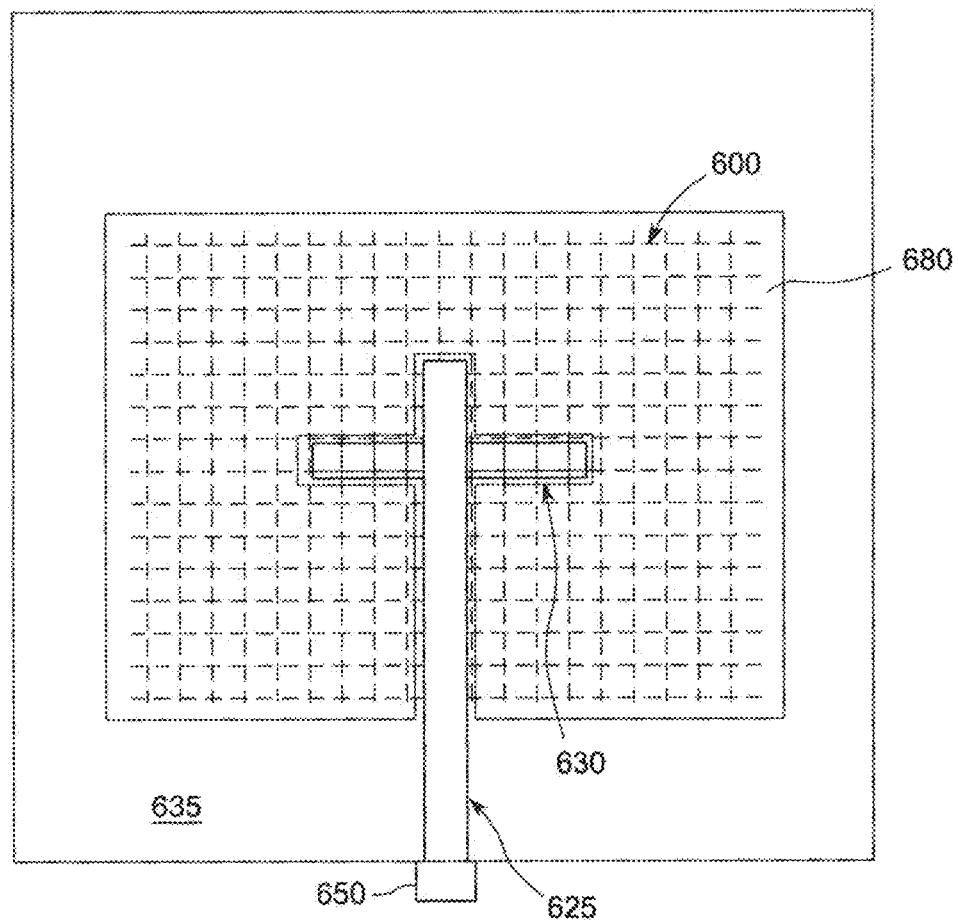
FIG. 7 is a bottom view of the meshed patch of an embodiment of the present invention from FIG. 6.

FIG. 7 is a bottom view of the meshed patch of an embodiment of the present invention from FIG. 6. FIG. 7 depicts the mesh patch 800 connected to a microstrip feedline 625 through an aperture 630. Signals travel to and from the patch through the microstrip feedline 625 to through a connector 650. Specifically, the aperture 630 allows for connection to the microstrip feedline 625, ground plane 680, substrate 635, and ultimately a For Mobile Equipment (FME) connector 650. However, alternative RF connectors and coupling techniques may also be realized.

Figure 8:
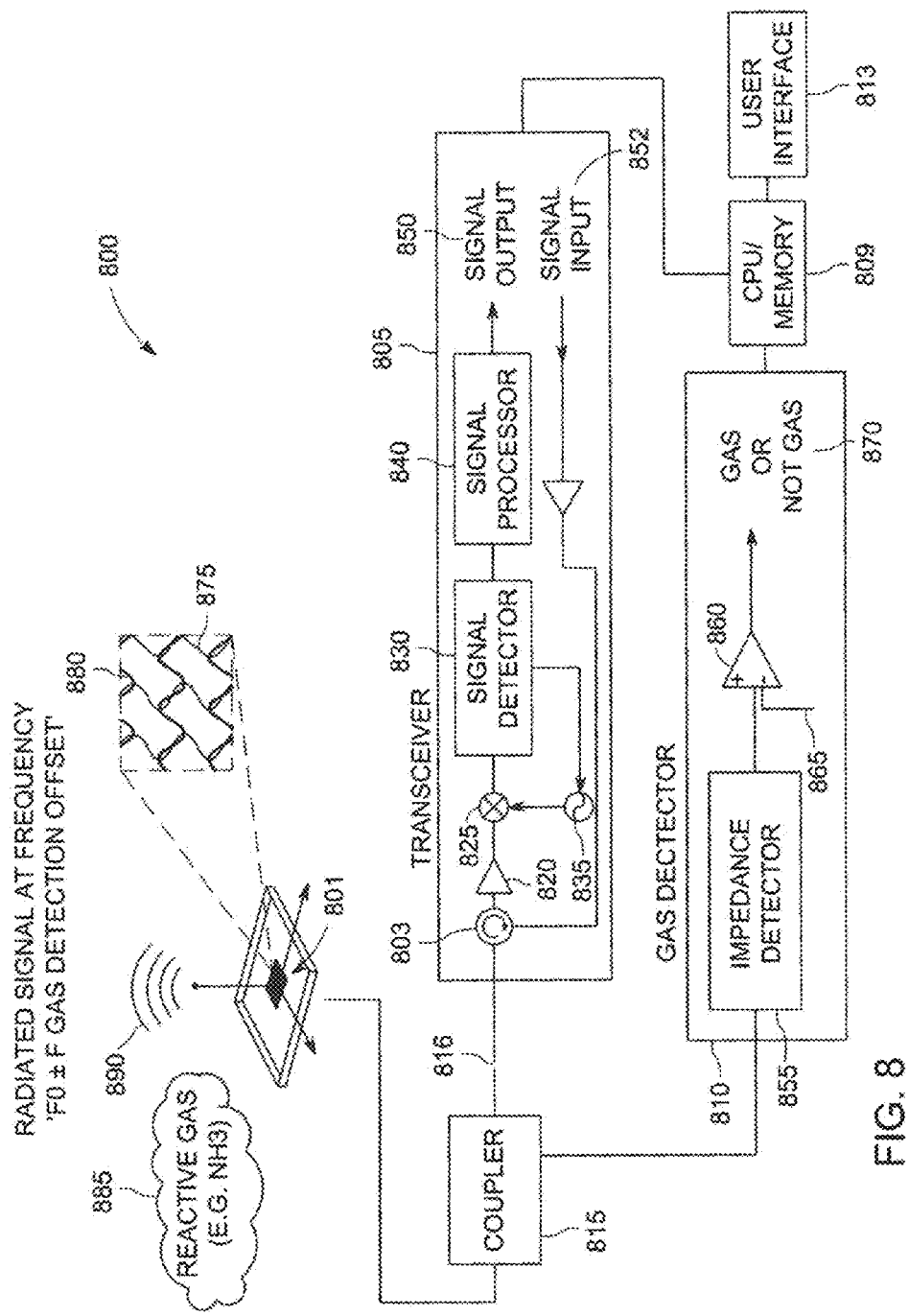
FIG. 8 is a block diagram for an embodiment of the invention.

FIG. 8 is a block diagram of a system 800 that utilizes the mesh patch as a sensor in accordance with an embodiment of the invention. During operation, the system 800 may transmit and/or receive wireless communication signals 890 or other RF/microwave signals for use, for example in RADAR, via the patch 801. The system comprises a patch sensor 801, a coupler 815, a transceiver 805, a gas detector 810, CPU/Memory 809, and a user interface 813. The system 800 may have alternate receiving and transmitting signals either physically, such as alternating lines or chronologically through time division utilizing a transceiver 805. The system additionally may simultaneously, substantially simultaneously, or separately detect gases 810 in the surrounding environment.

In one embodiment of the invention, defects are introduced into the semiconducting threads 880 of the patch 801. The defects ensure that the threads exhibit lower conductivity than their conductive thread neighbors 875 and acting almost as a dielectric buffer. The defects also provide more locations for reactive gas molecules to donate or accept electrons, thus increasing the likelihood that a reactive gas will cause a noticeable change in the semiconducting thread 880 permittivity. The arrangement of semiconducting and conducting threads may be varied in other embodiments. Gas detection capability is realized when an oxidizing or reducing gas 885 changes the permittivity of the semiconducting thread such that a received electromagnetic or wireless signal 890 is distorted. The distortion may then can be compared to a predetermined expected baseline signal to determine the presence of a gas and its concentration.

The system 800 further processes a signal from a coupler 815 which is then processed by a transceiver portion 805 and/or a gas detector 810. The transceiver 805 comprises a circulator/isolator 803, a first amplifier 807, a second amplifier 820, a mixer 825, a local oscillator 835, a signal detector 830, and a signal processor 840. A coupler 815 connects the transceiver 805 to the patch sensor 801. For communications signals, the patch sensor 801 operates as an antenna. The circulator/isolator 803 directionally couples the signal to/from the coupler 815 and to/from the transceiver's receiver and transmitter. In a transmitter mode, a user interface 813 sends commands to the CPU/Memory 809, such that there is a signal input 852 to a first amplifier 807 which passes the signal to the circulator/isolator 803, and ultimately to the patch 801 for transmission. In a receiver mode, the transceiver 805 receives a signal from the circulator/oscillator 803 via a second amplifier 820. The signal 816 is then mixed with a local oscillator 835 within a mixer 825. The local oscillator 835 is controlled (e.g. frequency and/or phase locked) to the received signal. A signal detector 830 processes the mixed signal to create the oscillator control signal as well as provide detected signal information (e.g., modulation) to the signal processor. The signal processor 840 produces an output 850 that is coupled to the CPU/Memory 809 and, ultimately, to the user interface 813. In some embodiments, the user interface 813 may comprise a display, keyboard, mouse, and other peripheral devices.

The gas detector 810 comprises an impedance detector 855, comparator operational amplifier 860 and threshold generator 865. The sensor 801 is coupled to an impedance detector 855. The impedance detector 855 senses the impedance of the sensor 801 (e.g. a resonance impedance by applying an RF signal to the sensor 801). The impedance value is coupled to the comparator 860 and compared to a predetermined threshold level 865. A change in the impedance will show as a difference value of the resulting signal 816 that forms the output. The result may be processed and/or stored in the CPU/Memory 809 and ultimately displayed to the user through the user interface 813. The CPU/Memory 809 may also provide analog to digital conversions, digital to analog conversions, and various digital signal processing. An all digital solution may be used by implementing the transceiver 805 and gas detector 810 as software modules within the CPU/Memory 809. As such, the signals from the path sensor 801 would be digitized and processed as described above.

The multifunctional system 800 is implemented as a gas detector by taking advantage of newly discovered reactions of types of CNTs when introduced to particular oxidizing gases 885. Thus, the mesh antenna patch comprises two measurable properties, invariant and variant. The first invariant property allows the transceiver to communicate through the conductive lines 875. The second variable property interacts with the environment to provide a gas sensing capability through semiconductive lines 880. The reactions of the invariant property have been exploited as an ambient gas sensor by incorporating semiconductive SWNT thread lines 880 with a high number of defects along as part of an electromagnetic wave resonator of the embodiment. Oxidizing and reducing gases such as He (helium), Ar (argon), $N_2$ (nitrogen), $NH_3$ (ammonia) and $O_2$ (oxygen) proximate to CNT threads temporarily affect the permittivity and conductivity of such CNTs in the semiconductive material.

In some embodiments, wireless communication is to be continuously performed through the transmission or reception of electromagnetic waves on the conductive threads 875. Simultaneously or nearly simultaneously, the semi-conductive threads 880 are performing gas sensing by detecting an impedance change. The radiating signals may originate from the patch 801 or in other embodiments may also be received from a separate source (not shown) which is distinct from the meshed patch antenna 801 structure in other embodiments.

A multifunctional device is thus realized when the invariant conductive CNT threads 875 serve as the meshed patch antenna structure and the variant semiconducting CNT threads 880 serve as dielectric spacer material with variable permittivity. In one embodiment, the meshed CNT thread patch 800 may simultaneously serve as both the radiating antenna for a communications system 805 and as the dielectric loaded resonator for a gas detector 810.

Figure 9:
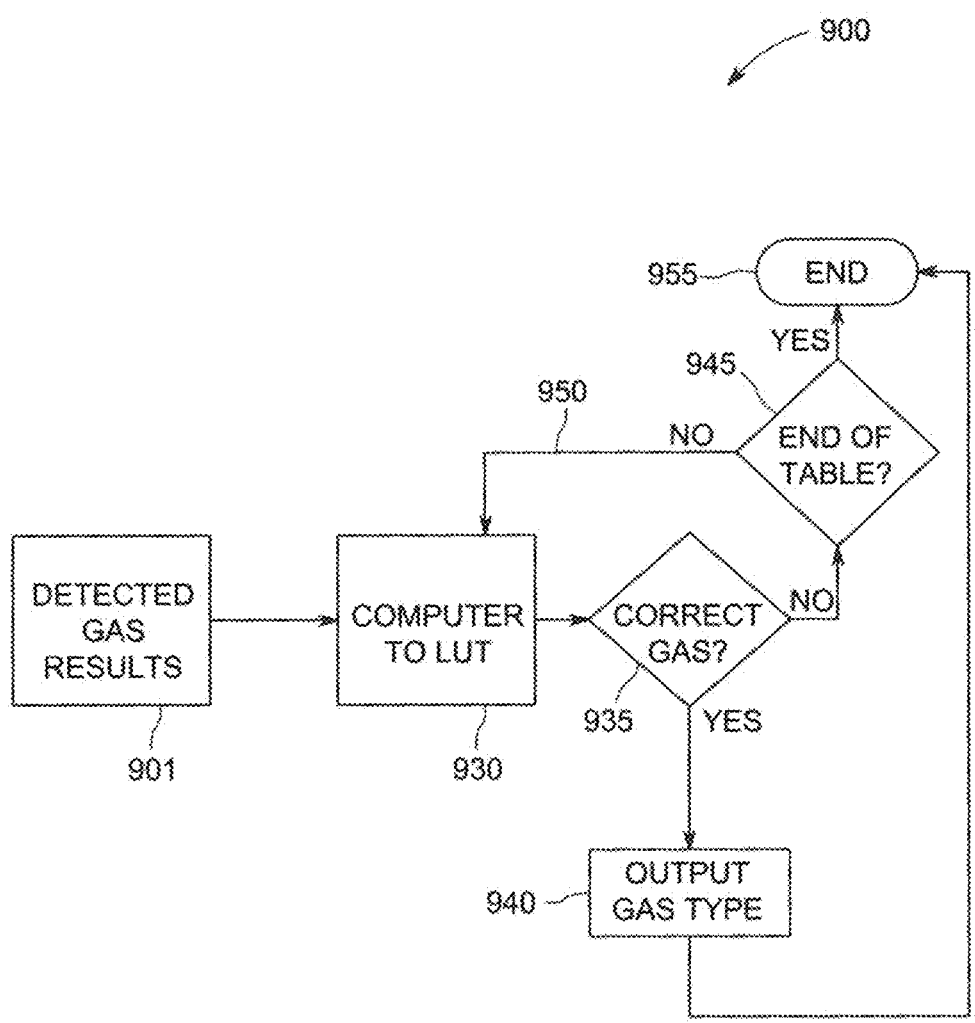
FIG. 9 depicts a flow diagram of a method of operation of an embodiment of the present invention.

FIG. 9 depicts a flow diagram of a method of operation of a routine executed by the CPU to detect specific gases in accordance with an embodiment of the present invention. The exemplary method 900 for determining the gas type comprises comparing detected results received at step 901 against a look up table (LUT) 939. The method 900 begins by receiving gas detection results at step 901. The results are then compared to a look-up-table (LUT) at step 930. The LUT comprises predetermined impedance values of gases (e.g., difference values measured against a threshold value). Should it be determined that a gas is found at step 935 (i.e., a value compares favorably to the LUT values), the method outputs the gas type at step 940 and ends the comparison at step 955. The method continues the comparison at step 945 as long as the end of the LUT has not been reached. However, if the comparison reaches the end of the table at step 945, without outputting a correct gas type 950, the process ends at step 955, notifying the user that no match was found or there is a need for manual entry of the gas type if the type is known.

Figure 10:
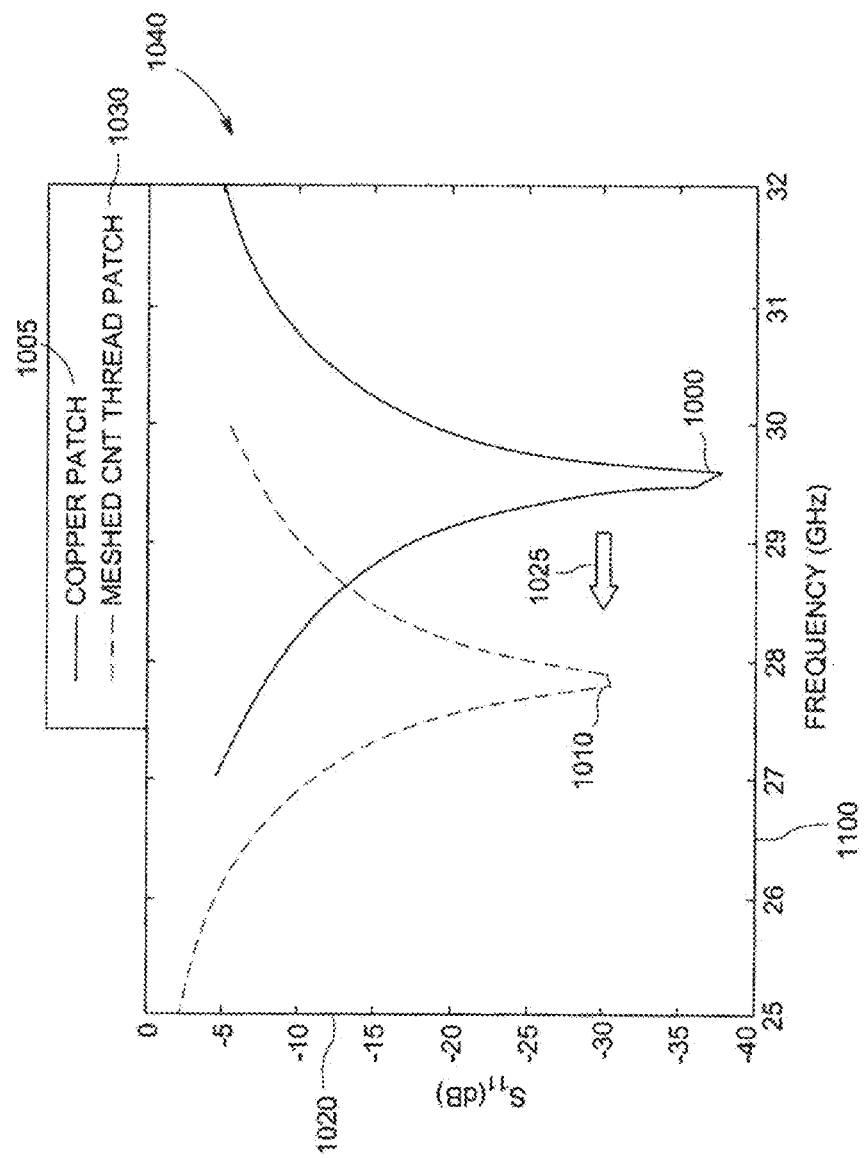
FIG. 10 depicts a graph of the frequency shift anticipated by the mesh structure of an embodiment of the present invention compared to a traditional copper patch antenna.

FIG. 10 depicts a graph 1040 of the frequency shift anticipated by the mesh structure of an embodiment of the present invention compared to a traditional copper patch antenna. FIG. 10 depicts the frequency response 1000 of the copper patch 1005 compared to the frequency response 1010 for meshed CNT thread patch 1030 of an embodiment of the invention. FIG. 10 shows an exemplary shift in frequency 1100 and reduction in gain reduction when compared to that of a standard copper patch antenna 1005 which is used as a baseline standard. FIG. 10 further shows there is about a 2 GHz or 7% shift 1025 in frequency and noticeable bandwidth reduction of about 400 MHz (16%) 1020 from the center frequency of the baseline. The shift is noticeable but acceptable for operation of the mesh antenna, especially when taken in light of the dual-functionality to operate also as a gas detector.

Figure 11:
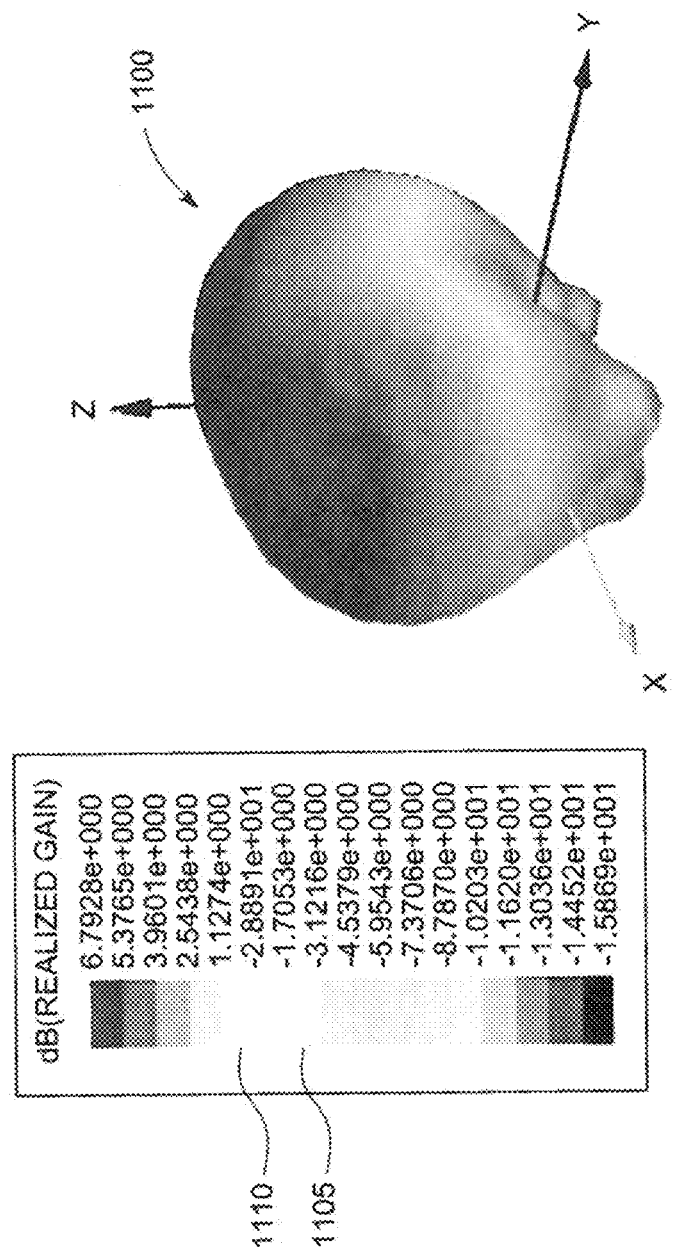
FIG. 11 depicts a graph of a radiation pattern of an embodiment of the present invention.

FIG. 11 depicts a graph of a radiation pattern of an embodiment of the present invention. The exemplary broadside radiation pattern 1100 maintained with one embodiment of a CNT meshed patch antenna. The meshed patch yields a small gain reduction 1105 when compared with traditional solid metal patch design 1110, such a reduction is acceptable for wireless communication fidelity.

Figure 12:
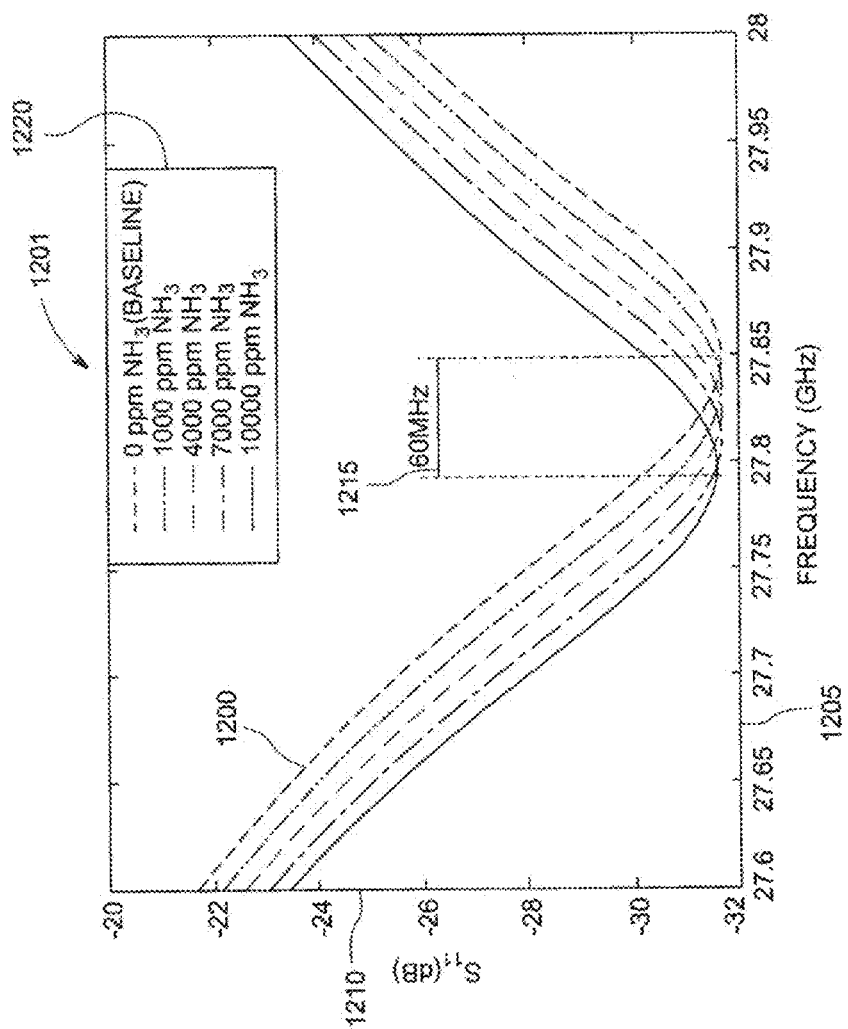
FIG. 12 depicts a graph of frequency shifts in detected signal based on the amount of gas present achieved by an embodiment of the present invention.

FIG. 12 depicts a graph 1201 of frequency shifts (indicative of an impedance change) in the detected signal based on the amount of gas present achieved by an embodiment of the present invention. Reference 1220 identifies a key showing the amounts of $NH_3$ introduced into the atmosphere surrounding a patch sensor of, for example, FIG. 8. The graph 1201 plots $S_{11}$ (shown as 1210) versus frequency 1205. Permittivity ($\in_r$) of the semiconducting SWNT threads increases linearly when in the presence of the $NH_3$. The estimated change for an applied signal 1200 is plotted from $\in_r=5$ to $\in_r=5.15$ in the presence of 1000 ppm of $NH_3$ and subsequent increases of 0.15 with each additional 3000 ppm. A measureable resonant frequency 1205 shift of −60 MHz 1215 is thus shown in FIG. 12 as a prediction to occur as the concentration of $NH_3$ is increased around the meshed patch antenna. Through comparing the shift to a signal from predetermined baseline gas concentration 1220, to one can determine the presence of a particular gas. There is, also a slight reduction in the signal bandwidth. The frequency shift 1215 is thus detectable but small enough to guarantee continuous bandwidth for wireless communications functionality.

In other exemplary embodiments, RF signals may also be processed such that the resonant or center frequency shift 1215 will be compared to predetermined profiles of gases to determine the presence of a specific gas surrounding the sensor. Profiles may be calculated based on findings of predetermined results and thus compared to instant readings from the embodiment. This is because the center frequency shifts in direct response to the change in the permittivity of the CNT layer that occurs due to the presence of a reactive gas 1220. Ultimately the exemplary embodiment would have the frequency shift 1215 in the resonant frequency detected on semiconductive thread lines while maintaining communication of wireless signals on the first conductive thread lines of the mesh structure. Further embodiments may have the detected RF signal originate from conductive thread lines of the mesh or from a source completely external and separate from the mesh.

By bundling the nanotubes together into longer fibers such as threads or ropes, it has been determined that since nanotubes can be made into a thread, it can be woven together on a larger scale similar to and/or in conjunction with textile threads. When implemented with textiles, air between layers may become the substrate or layers of textile threads may become the substrate for the nanotube threading.

Thus, specific embodiments not detailed herein will include the mesh pattern that may be incorporated into articles of clothing, wristbands, lightweight aircrafts, and have off-chip designs for processing may also be realized in the future. Fabrication steps will also include factors such as various crystalline structure as well as specific programmable functionality for gas detection and communication systems integration. Other embodiments are also able to detect EMI, moisture, temperature, humidity, and those environmental factors affecting dielectric properties and permittivity. Further future embodiments may include structures of different weave patterns, layers, or separate transmitting and receiving communication lines.

While the foregoing is directed to embodiments of the present disclosure, other and further embodiments may be devised without departing from the basic scope thereof, and the scope thereof is determined by the claims that follow.

The invention claimed is:

1. A method for providing multiple functions using carbon nanotube threads comprising:
    interweaving first carbon nanotube threads and second carbon nanotube threads, the first carbon nanotube threads and the second carbon nanotube threads alternately crossing each other substantially orthogonally to define a mesh element;
    measuring an invariant property of the first carbon nanotubes threads, and measuring a variant property of the second carbon nanotube threads, and
    detecting a frequency shift in the resonant frequency received on the second semiconductive nanotube threads while maintaining communication of wireless signals on the first conductive nanotube threads,
    wherein the first carbon nanotube threads comprises conductive multiwall carbon nanotube threads and the second carbon nanotube thread comprises semiconductive multiwall carbon nanotube threads with defects added.

2. The method of claim 1 further comprising an aperture to connect the first and second carbon nanotube threads to a microstrip and a connector, found on the substrate.

3. The method of claim 1 wherein intersections of the first carbon nanotube threads with the same material are electrically connected and intersections of the second carbon nanotube threads comprising the same material are electrically connected.

4. The method of claim 1 further comprising detecting the frequency shift in the resonant frequency received to detect a gas and determining a gas type using a look up table.

* * * * *